April 19, 1927.
Re. 16,601
L. G. DANIELS
OIL AND GAS BURNER
Original Filed Jan. 17, 1922
Fig. 1.
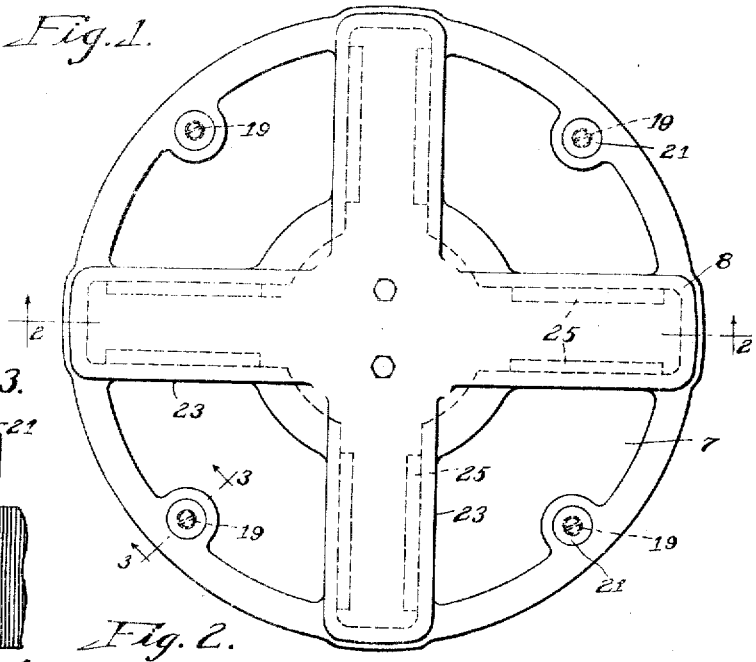
Fig. 3.
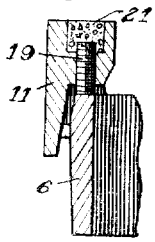
Fig. 2.
Fig. 4.
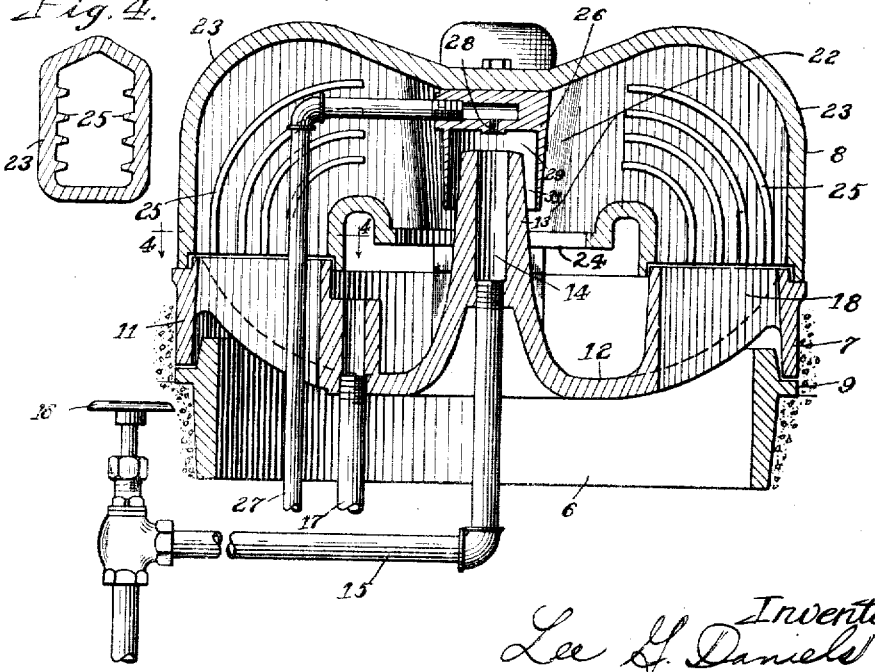
Inventor:
Lee G. Daniels
By Wilson & McCanna
Attys.

Reissued Apr. 19, 1927. Re. 16,601

UNITED STATES PATENT OFFICE.

LEE G. DANIELS, OF ROCKFORD, ILLINOIS.

OIL AND GAS BURNER.

Original No. 1,484,814, dated February 26, 1924, Serial No. 529,824, filed January 17, 1922. Application for reissue filed May 23, 1925. Serial No. 32,517.

This invention relates to liquid fuel burners adapted for use in heaters and furnaces, and has more particularly reference to oil burners, and also to a combination oil and gas burner. The liquid fuel used in burners of this character is a hydrocarbon, low gravity oil which is inherently difficult to bring to a state of combustion, especially with a simple and inexpensive burner, such as the requirements of this trade demand.

One of the important objects of the present invention is the provision of a combined oil and gas burner of novel construction which will be practical and efficient. In this regard, my invention contemplates the use of gas, first as a pilot lighter to facilitate starting the burner, and secondly as a primary burner in conjunction with the oil burner to suit the conditions and requirements of those localities in which both oil and gas may be economically used as fuel.

Another object is the provision of an oil burner comprising the following principal parts, namely: a base, a burner bowl and an air pipe casing arranged in a novel and particularly advantageous manner and permitting ready assembly and accurate adjustment of the parts to obtain most efficient results.

Still another object is the provision of an air pipe or air supply casing embodying heat radiating ribs designed to increase the efficiency of the burner.

In furtherance of the foregoing, I have aimed to provide a burner consisting of comparatively few parts constructed in such simple manner that they may be produced at a low cost and may be quickly and easily assembled and adjusted, and which when in operative condition will function very efficiently and will serve in a satisfactory manner the purposes intended.

Other objects and attendant advantages will be appreciated by those skilled in this art as the invention becomes better understood by reference to the following description when considered in connection with the accompanying drawings, in which—

Figure 1 is a top view of a burner embodying my invention;

Fig. 2 is a vertical sectional view through the burner taken substantially on the line 2—2 of Fig. 1; and Figs. 3 and 4 are detail sectional views taken substantially on the lines 3—3 and 4—4 of Figs. 1 and 2, respectively.

The principal parts mentioned above, namely, the base, burner bowl and air-pipe casing are designated generally by characters 6, 7 and 8, respectively. These parts are preferably castings. The base 6, annular in form, has a peripheral flange 9 and is adapted to be permanently set into a furnace or heater, preferably by cementing below the flange 9.

The burner bowl 7 has an annular portion 11 adjustably supported on the base as will be described, and has a bowl portion 12 at the center of which is formed an upstanding burner 13. This burner is of frusto-conical shape and is referred to herein as a cone burner. There is a central fuel passage 14 through the burner proper, and a liquid fuel supply pipe 15 connects with the lower end of this fuel passage. Any suitable means may be provided for regulating the flow or feed of fuel through the pipe 15, such for example as a regulating valve 16. An overflow pipe 17 is provided for the bowl 12 as a safety factor, permitting overflow of the liquid fuel to actuate a shut-off valve, such as described in my Patent No. 1,524,914, in the event that the burner flame should accidentally be extinguished. However, any suitable safety device may be employed, although its use is not essential to the present invention. The burner bowl is also shaped to provide a plurality, four in the present instance, of circumferentially spaced vertical air passages 18. The means for adjustably supporting the burner bowl on the base consists in the present instance of a number of equally spaced set screws 19 threadingly engaged in the rim portion of the bowl 11, as shown in Fig. 3, and resting on the top of the base 6. By proper adjustment of these set screws the burner bowl may be very accurately leveled, that is, as regards position of the burner proper, so that the oil rising in the passage 14 will be equally distributed over the top of the cone burner and will flow down evenly over the entire peripheral area of said burner. Such an adjustment is an important factor in a burner of this character as it is a means of insuring equal distribution of the oil and promotes better combustion and greater efficiency. The set screws may be locked in the set position by means of a suitable plastic filling 21 which may, if desired, be subsequently removed for the purpose of readjusting the set screws in the event that the burner should get out of alignment by shifting or settling of the furnace.

The air supply casing is shaped to provide a central mixing chamber 22 surrounding the burner 13 and further to provide radial pipes 23 registering with the air passages 18. The pipe portions 23 of the air supply casing seat on the burner bowl and thus support said casing in position. The mixing chamber 22 has at its lower end an annular outlet 24 about the burner, through which outlet the products of combustion escape, as will be presently described. The air drawn into the mixing chamber through the passages 18 and the pipes 23 will be heated by reason of the fact that the burner flames envelop the pipes 23. This air will be brought to a high temperature by reason of the radiating ribs 25 formed on the interior walls of the pipes 23 and shaped to follow the general course of the air therethrough.

I have now provided a gas burner combined in a novel manner with the oil burner and adapted to serve both as a pilot lighter and as a primary burner, or in conjunction with the oil burner, or independently thereof. In the present example, this gas burner consists of a hood or inverted cup shaped cap 26 supported by the air supply casing 8 centrally above and inclosing the top of the burner 13. A gas supply 27 connects with the gas burner as shown, and the gas is delivered downwardly through a jet opening 28 into the chamber 29 formed by the hood 26. The gas will issue through the opening 31 peripherally about the cone burner 13 and the flame will completely envelop said cone, thereby bringing to a state of combustion the film of oil flowing down the peripheral wall of the cone.

In operation, the gas burner serves as a pilot burner and by heating the cone burner enables quick and convenient lighting of the oil burner. This pilot lighter is especially desirable, because of its convenience as distinguished from prior oil burners now in common use, which are more or less inconvenient and difficult to light. This facility of lighting has another advantage. It insures a continuous flame, which in the absence of a pilot burner is sometimes extinguished by a strong or sudden draft. The gas burner may be also used as a primary burner either in conjunction with the oil burner or independently thereof, according to the conditions at hand. This is especially desirable in those communities in which both oil and natural gas are available as fuel but the supply varies and at certain times in the year may be very low either on account of increased consumption or for other reasons. In such event, the owner of a burner of the character described herein may adjust the fuel feed to best suit the particular conditions at hand. As regards the function of the burner, it will be manifest that the oil rising in the passage 14 will flow over the top of the cone burner, equally distributed circumferentially thereabout, and will flow down the periphery of said burner. The oil will be heated first by conduction from the burner, which in turn has been heated by the gas flame and by combustion of the oil on the periphery of the burner, and will be finally heated and brought to a state of combustion by the flame at the bottom of the mixing chamber. In efficient operation of this burner the oil will be consumed before it reaches the bottom of the cone. It will also be noted that by reason of the facilities for heating the air, quicker and better combustion will be insured.

It is believed that the foregoing conveys a clear understanding of the objects prefaced above, and while I have illustrated but a single working embodiment, it should be understood that considerable change might be made in details of construction without departing from the spirit and scope of the invention as expressed in the appended claims.

I claim—

1. In a liquid fuel burner, the combination of a cone burner, a central fuel supply passage therein, whereby the fuel flows over the top and down over the periphery of the cone burner, a gas supply hood embracing the top of the cone burner and leaving a peripheral opening about the same, and a gas supply pipe entering said hood from one side thereof, whereby a gas flame will be delivered downwardly peripherally about the cone burner.

2. In a burner of the character described, the combination of a burner bowl having an upstanding cone burner provided with a central oil passage from which the oil flows over the top of the burner and down the outer side thereof, an air supply casing over said burner, and a gas supply pipe extending upwardly through the burner bowl at one side of the burner and upwardly through the air supply casing and thence laterally to a point in proximity to said burner for directing a gas flame downwardly onto the cone burner.

3. A burner of the character described comprising a stationary annular base, a burner bowl supported on said base plate and having a central upstanding cone burner and a plurality of circumferentially spaced vertical air passages, an air-supply casing supported on said bowl and shaped to provide a mixing chamber about the cone burner and a plurality of air pipes radiating from said mixing chamber and registering with the air passages in the bowl, said casing having an outlet above the cone burner at the bottom of said mixing chamber, and a gas burner in said mixing chamber for directing a flame peripherally of the cone burner.

4. A liquid fuel burner of the character described comprising an annular base, an annular burner bowl seated on the base and having a central upstanding burner cone and circumferentially spaced vertical air passages, a fuel supply pipe connected to said cone burner, an air pipe casing seated on the burner casing and having air passages registering with those in the burner casing, said passages terminating in a mixing compartment surrounding the cone burner and having a lower outlet for the escape of products of combustion, a gas supply hood concentric with and embracing the cone burner, and a pipe for supplying gas to said hood, whereby the gas flame is directed downwardly about the cone burner.

5. A burner of the character described comprising an annular base, a burner bowl adapted to be seated on the base and carrying an upstanding burner and a mixing chamber casing about the burner, and means adjustably supporting the burner bowl upon said base for leveling the burner.

6. A burner of the character described comprising an annular base, a burner bowl adapted to be seated on the base and carrying an upstanding burner and a mixing chamber casing about the burner, and means adjustably supporting the burner bowl upon said base comprising a plurality of adjustable elements spaced circumferentially of the burner bowl for effecting vertical adjustment of the bowl with respect to the base.

7. A burner of the character described comprising a base adapted to be fixedly secured in a furnace or heater, an upstanding liquid fuel burner having a central fuel supply passage through which fuel is delivered over the top of the burner and downwardly over the peripheral wall thereof, and means supporting the burner on said base with capacity for adjustment to insure even distribution of the oil over said peripheral wall.

8. In a burner of the character described, the combination of a burner bowl, a cone burner therein, a mixing chamber about the burner, said burner having a central vertical liquid fuel supply passage whereby the fuel will flow over the top of the burner and down the outer side thereof, and means for adjusting said cone burner to insure even distribution of the oil peripherally about the burner.

9. In a liquid fuel burner of the character described, the combination of a burner bowl having a central upstanding cone burner, an air supply casing forming a mixing chamber about the burner and providing a plurality of radiating air pipes, and heat radiating ribs in said air pipes.

10. In a liquid fuel burner of the character described, the combination of a central burner, a casing providing a mixing chamber about the burner, and air supply pipes radiating from said mixing chamber and having internal heat radiating ribs.

11. A burner of the character described comprising a burner bowl having a central upstanding cone burner, a fuel-supply pipe connected to said cone burner, whereby fuel will be delivered downwardly over the outer side of the burner, said bowl having a plurality of circumferentially spaced vertical air passages, an air-supply casing above the burner bowl forming a mixing chamber about the cone burner and having a plurality of air-supply pipes radiating from said chamber and registering with said vertical passages, a gas burner in said mixing chamber carried by the air-supply casing, and means for supplying gas to said burner.

12. A burner of the character described comprising a burner bowl having a central upstanding cone burner, a fuel-supply pipe connected to said cone burner, whereby fuel will be delivered downwardly over the outer side of the burner, said bowl having a plurality of circumferentially spaced vertical air passages, an air-supply casing above the burner bowl forming a mixing chamber about the cone burner and having a plurality of air-supply pipes radiating from said chamber and registering with said vertical passages, a gas burner carried by the air-supply casing above the cone burner, and means for supplying gas to said burner.

13. A burner of the character described comprising a burner bowl having a central upstanding cone burner, a fuel-supply pipe connected to said cone burner, whereby fuel will be delivered downwardly over the outer side of the burner, said bowl having a plurality of circumferentially spaced vertical air passages, an air-supply casing above the burner bowl forming a mixing chamber about the cone burner and having a plurality of air-supply pipes radiating from said chamber and registering with said vertical passages, a gas burner in said mixing chamber, and a gas-supply pipe extending through one of said air passages and air pipes and connected to the gas burner.

14. In an oil burner, in combination, a burner bowl having a liquid fuel burner, an air supply casing overlying the burner bowl adapted to be heated by the burner and to deliver air thereto for supporting combustion, and a gas supply conduit extending through said air supply casing and having a delivery opening directed downwardly toward the burner for delivering a gas flame onto said burner for heating it and igniting the liquid fuel.

15. In an oil burner, in combination, a burner bowl having a liquid fuel burner; means providing an air supply for the burner comprising an air casing overlying the burner and adapted to be heated thereby so as to preheat the air delivered to the burner, and an air inlet passage for said casing extending up through the burner bowl; and a gas lighter pipe extending up through said air inlet passage and adapted for delivering a gas flame for lighting the burner.

16. In combination, a liquid fuel burner, an air supply conduit for delivering air thereto having an air inlet extending upwardly at the side of the burner and over the same so as to be heated by the flame, and a gas supply pipe extending through said inlet and providing a pilot lighter for delivering a flame onto the liquid fuel burner through the delivery end of said air inlet.

17. In combination, a liquid fuel burner, an air supply casing for delivering air to said burner, said casing being so located as to be heated by the burner for pre-heating the air delivered thereto, and a gas lighter including piping disposed within said air supply casing extending to a point sufficiently close to the delivery end of the casing for delivering a gas flame through said delivery end onto the burner for lighting the same.

18. In an oil burner of the character described, comprising a burner bowl having a central fuel delivery opening, and an air supply casing overlying the burner bowl having a central air delivery opening in the vicinity of the fuel delivery opening and a lateral air inlet opening, a gas lighter pipe for heating the bowl and igniting the fuel, said pipe being extended through said air inlet into said casing and within the casing to a point permitting the delivery of a flame into the burner bowl while the said piping remains shielded by the casing from the flame of the burner.

LEE G. DANIELS.

CERTIFICATE OF CORRECTION.

Reissue Patent No. 16,601. Granted April 19, 1927, to

LEE G. DANIELS.

It is hereby certified that error appears in the printed specification of the above numbered patent requiring correction as follows: Page 2, line 129, claim 3, strike out the word "plate"; and that the said Letters Patent should be read with this correction therein that the same may conform to the record of the case in the Patent Office.

Signed and sealed this 17th day of May, A. D. 1927.

Seal.

M. J. Moore,
Acting Commissioner of Patents.